US007201819B2

(12) United States Patent
Wiedemann et al.

(10) Patent No.: US 7,201,819 B2
(45) Date of Patent: Apr. 10, 2007

(54) PROCESS FOR PRODUCING A SEALED WATER-SOLUBLE PACKAGE

(75) Inventors: Ralf Wiedemann, Ludwigshafen (DE); Marcus Guzmann, Mühlhausen (DE)

(73) Assignee: Reckitt Benckiser N.V., NZ Hoofddorp (NL)

( * ) Notice: Subject to any disclaimer, the term of this patent is extended or adjusted under 35 U.S.C. 154(b) by 0 days.

(21) Appl. No.: 10/491,515

(22) PCT Filed: Sep. 23, 2002

(86) PCT No.: PCT/GB02/04311

§ 371 (c)(1),
(2), (4) Date: Sep. 24, 2004

(87) PCT Pub. No.: WO03/029079

PCT Pub. Date: Apr. 10, 2003

(65) Prior Publication Data

US 2005/0028490 A1 Feb. 10, 2005

(30) Foreign Application Priority Data

Oct. 3, 2001 (GB) ................................ 0123684.3

(51) Int. Cl.
*B32B 37/16* (2006.01)
*B32B 38/00* (2006.01)
*B32B 38/12* (2006.01)
*B65D 65/46* (2006.01)

(52) U.S. Cl. ...................... 156/210; 156/146; 156/245; 156/281; 156/292; 156/308.4; 53/452; 53/453

(58) Field of Classification Search ................ 156/280; 53/452, 453, 456, 467, 471, 473, 476, 477, 53/478
See application file for complete search history.

(56) References Cited

U.S. PATENT DOCUMENTS

| | | | | |
|---|---|---|---|---|
| 2,399,401 A | | 4/1946 | Gager et al. | 260/36 |
| 3,892,905 A | * | 7/1975 | Albert | 428/220 |
| 4,267,145 A | * | 5/1981 | Wysong | 264/563 |
| 4,544,693 A | * | 10/1985 | Surgant | 524/375 |
| 4,885,105 A | * | 12/1989 | Yang et al. | 510/296 |
| 5,224,601 A | * | 7/1993 | Gouge et al. | 206/524.7 |
| 5,716,675 A | | 2/1998 | Andersen et al. | 427/384 |
| 5,933,702 A | * | 8/1999 | Goswami | 422/186.3 |
| 6,363,693 B1 | * | 4/2002 | Edwards et al. | 53/449 |
| 6,776,287 B1 | * | 8/2004 | Hinde et al. | 206/524.1 |
| 6,898,921 B2 | * | 5/2005 | Duffield | 53/452 |
| 2002/0013243 A1 | * | 1/2002 | Hewitt et al. | 510/293 |
| 2002/0033004 A1 | * | 3/2002 | Edwards et al. | 53/453 |
| 2002/0165109 A1 | * | 11/2002 | Cropper et al. | 510/295 |
| 2004/0182049 A1 | * | 9/2004 | Duffield | 53/452 |
| 2005/0065051 A1 | * | 3/2005 | Catlin et al. | 510/220 |
| 2006/0160716 A1 | * | 7/2006 | Fregonese et al. | 510/439 |
| 2006/0213801 A1 | * | 9/2006 | Karaoren et al. | 206/524.7 |
| 2006/0230709 A1 | * | 10/2006 | Duffield et al. | 53/427 |

FOREIGN PATENT DOCUMENTS

| | | | |
|---|---|---|---|
| JP | 53-26868 | * | 3/1978 |
| JP | 6-321702 | * | 11/1994 |
| JP | 9-87105 | * | 3/1997 |
| WO | 92/17382 | * | 10/1992 |
| WO | 93/08091 | * | 4/1993 |
| WO | 93/22215 | * | 11/1993 |
| WO | WO 00/55069 | | 9/2000 |

* cited by examiner

*Primary Examiner*—Melvin Mayes
(74) *Attorney, Agent, or Firm*—Norris McLaughlin & Marcus PA

(57) ABSTRACT

Process for producing a sealed water-soluble package of improved aesthetic appearance by treating at least part of the outer surfaces of the sealed package with a plasticizer composition and applying heat thereto, a package obtainable thereby and a specified use of such package.

12 Claims, No Drawings

PROCESS FOR PRODUCING A SEALED WATER-SOLUBLE PACKAGE

This application is a National Stage 371 application of PCT/GB02/04311 (now WO 03/029079 A1), filed on 23 Sep. 2002.

The invention is related to a process for producing a sealed water-soluble package, to a package obtainable thereby and to a specified use of such package.

Water-soluble packages are known in different fields of the industry and have recently become popular in the detergent industry for packaging and delivering specific detergent components for automatic dishwashing or laundry washing purposes.

Such water-soluble packages can be produced by either vertical form-fill-seal (VFFS) processes or thermoforming processes.

The thermoforming process generally involves moulding a first sheet of water-soluble film material to create recesses therein to receive a composition, filling the composition into the recesses, covering the recesses filled with the composition with a second sheet of water-soluble film material, and sealing said first and second sheets together at least around said recesses. One disadvantage of such sealed water-soluble packages produced by thermoforming, however, is their aesthetically non-satisfactory, crumbled appearance due to lack of control of shrinkage of the film material.

WO 00/55069 describes conditioning of sealed water-soluble packages of this type by holding them in an environment of raised relative humidity for a period of time. This conditioning is said to improve the impact resistance as well as the sturdiness and resilience of the package. The conditioning is said to take place at about 20° C. or below. It is not mentioned that the conditioning would have any impact on the appearance of the sealed packages, i.e. may avoid crumbling and wrinkle formation.

It is an object of the present invention to improve the aesthetic appearance of sealed water-soluble packages of above-mentioned type, and in particular to avoid crumbling and formation of wrinkles thereof.

According to the invention, this object is solved by treating at least part of the outer surfaces of the sealed package with a plasticizer composition and applying heat thereto.

Preferably, the water-soluble film material selected from the group consisting of polymers or polymer mixtures comprising polyvinyl alcohol or polyvinyl alcohol derivatives and mixtures thereof. The water-soluble film material of the first sheet and the second sheet might be the same or different.

In a preferred embodiment, treatment of the package with the plasticizer composition occurs for a time period of up to 60 seconds.

In a preferred embodiment, heat is applied simultaneously to the treatment with the plasticizer composition, more preferably by treatment with a plasticizer composition of raised temperature. Raised temperature in this context means a temperature higher than the temperature of the sealed package, preferably a temperature higher than the glass transition temperature of the film material of the packaging.

In a most preferred embodiment, treating of the sealed package with the plasticizer composition and applying heat thereto is combined in one step by applying steam or spray, produced from the plasticizer composition, and having a temperature equal or higher than the glass transition temperature (Tg) of the film material on at least part of the outer surfaces of the sealed package.

In a preferred embodiment, the plasticizer composition is selected from the group consisting of water, aqueous solutions, hydrophylic organic compounds or mixtures thereof, preferably having a boiling point of below 250° C., most preferably below 120° C., for example an aqueous solution of propylene diglycol or an aqueous solution of glycerol or mixtures thereof. Examples of such plasticizers can be found in U.S. Pat. No. 2,399,401 incorporated as reference herein.

Preferably, the composition contained within the package comprises at least one detergent component, most preferably as a liquid, gel or paste.

The preferred process for the creation of the recesses in the first sheet of water-soluble film material is by thermoforming. In this case, the recesses may be formed by heating the film material over a dye having respective cavities, wherein once heated the film material may be drawn into the cavities by vacuum to closely assume the shape of the cavities. The vacuum may be maintained throughout the subsequent filling and sealing steps. As a final step, the process may, of course, include the additional steps of separating the formed packages, e.g. by cutting.

In another preferred process, the recesses are formed on an array of cavities where the film is heated to 90–130° C. and then, simultaneously to drawing the film into the cavities by means of a vacuum, blown by a stream of compressed air (0,1–5 bar) thereinto from the upside. When the film is released from the vacuum station it remains in the shape determined by the cavities. The film is then progressed to the filling station where the filling material is supplied to the deep drawn areas in the film. Subsequently a second sheet of water-soluble film material is then superimposed onto the first sheet covering the filled recesses and heat-sealed thereto using a heating plate. Therefore, the filled material is deposited in the cavities and raised flanges surrounding each cavity ensure that the films are sealed together along the flanges to form a continuous closed seal. Then the film is transported further to a cutting station separating the individual filled recesses from each other.

Moreover, the invention is directed to a package obtainable by the inventive process as well as to the use of such a package in an automatic dishwashing or laundry washing process.

The invention will now be described in more detail by way of the following example.

EXAMPLE

In this example a thermoforming process is described for the production of sealed water-soluble packages according to the invention. The whole processing area was kept at 30–50% relative humidity (RH) and the temperature was maintained between 20 and 35° C. Both for the water-soluble film material of the first sheet and of the second sheet a polyvinyl alcohol was used which is obtainable under the trade name PT75 from Aicello. However, similar materials such as PT60, also obtainable from Aicello as well as L712D, obtainable from Aquafilm, or any other film from these companies and/or of the companies Chris Craft, Tohallo, Kuraray, Nippon Gohsei, Idroplast or others may be used independently as first and/or second sheet.

A first sheet of PT75 is placed over a plurality of cavities in a forming dye. Each cavity is rectangular shaped having a volume of about 22 ml. The film is delivered to the forming dye in crease free form with minimum tension. In the forming step, the film material is heated to 90 to 130° C. for up to 5 seconds, preferably around 0.5 to 1 second. The heated film material is drawn into the cavities by vacuum and/or by additionally applying pressure from the opposite side, forming a plurality of recesses in the sheet, which, once formed, are retained in their thermoformed orientation.

Once the recesses are formed, the film is transported to the filling station where the composition, e.g. a detergent material in gel form, is filled into each of the recesses. A second sheet of PT75 film material is then superimposed in the sealing station onto the first sheet covering the filled recesses and heat-sealed thereto using a heating plate. The raised flanges surrounding each cavity ensures that the films are sealed together along the flange to form a continuous closed seal.

Once sealed, the packages formed are separated from the web of sheet using cutting means. According to the present invention, the sealed packages are treated with a plasticizer composition and, simultaneously or separately, heat is applied.

In this example, a hot water steam of a temperature of 100–120° C. is applied onto the surfaces of the ejected packages for a period of 0.5–2 s. In an alternative process, the hot steam or spray may also be applied onto the deep drawn part of packages via the apertures in the dye which has been used to draw the vacuum. In a preferred process the hot steam or spray may be applied while the filled cavities are still part of the web. Then the treated packs are allowed to dry and/or fully absorb the applied material until the film surface has lost its stickiness. Once conditioned, the packages formed are separated from the web of sheet using cutting means.

There are a number of different ways for the realization of specific process steps of the present invention. It, however, appears that good results are obtainable as long as the two key issues are met, namely treatment of the film material with a plasticizer composition in steam, mist or spray form and applying heat to the film material, preferably sufficiently to raise the temperature of the film material to or above its glass transition for temperature (Tg).

As a result of those two measures, the film material shrinks back resulting in a sealed package with smooth surfaces, i.e. fitting closely around its content without any substantial wrinkles or crumbling.

The features disclosed in the foregoing description and the claims may, both separately and in any combination thereof, be material for realizing the invention in diverse forms thereof.

The invention claimed is:

1. A process for producing a sealed water-soluble package containing a composition, the process comprising the steps of moulding a first sheet of water-soluble film material to create recesses therein to receive said composition;

filling said composition into said recesses;

covering said recesses filled with said composition with a second sheet of water-soluble film material; and sealing said first and second sheets together at least around said recesses;

wherein the process additionally comprises treating at least part of the outer surfaces of the sealed package with a plasticizer composition, wherein the plasticizer composition is an aqueous solution of propylene diglycol or an aqueous solution of glycerol or a mixture thereof and applying heat thereto.

2. Process according to claim 1, wherein the water-soluble film material is selected from the group consisting of: polymers or polymer mixtures comprising polyvinyl alcohol or polyvinyl alcohol derivatives and mixtures thereof.

3. Process according to claim 1, wherein treatment of the package with the plasticizer composition occurs for a time period of up to 60 seconds.

4. Process according to claim 1, wherein heat is applied simultaneously to the treatment with the plasticizer composition.

5. Process according to claim 4, wherein heat is applied by treatment with the plasticizer composition which is one of raised temperature.

6. Process according to claim 5, comprising applying steam or spray, produced from the plasticizer composition, and having a temperature equal or higher than the glass transition temperature (Tg) of the film material on at least part of the outer surfaces of the sealed package.

7. Process according to claim 1, wherein said composition contained within said package comprises at least one detergent component.

8. Process according to claim 7, wherein said composition is liquid, gel or paste.

9. Process according to claim 1, wherein the recesses are created by thermoforming.

10. Process according to claim 1 wherein treatment of the package with the plasticizer composition occurs for a time period of up to 2 seconds.

11. Process according to claim 1 wherein the process comprises: treating at least part of the outer surfaces of the sealed package with a steam, mist or spray produced from the plasticizer composition and separately applying heat thereto.

12. Process for producing a sealed water-soluble package containing a composition, the process comprising the steps of:

providing a die having cavities, and one or more apertures for drawing a vacuum in said cavities;

moulding a first sheet of water-soluble film material in said die to create recesses therein to receive said composition;

filling said composition into said recesses;

covering said recesses filled with said composition with a second sheet of water-soluble film material; and sealing said first and second sheets together at least around said recesses, wherein the process additionally comprises treating at least part of the outer surfaces of the sealed package in the cavity with a steam, mist or spray produced from a plasticizer composition via the one or more apertures and applying heat thereto.

* * * * *